United States Patent [19]

Ahn et al.

[11] Patent Number: 4,740,250
[45] Date of Patent: Apr. 26, 1988

[54] ALUMINIUM BASE-ALLOY FOR HEAD DRUM OF VIDEO CASSETTE RECORDERS

[75] Inventors: Dong H. Ahn, Seoul; Tae S. Park, Suwon, both of Rep. of Korea

[73] Assignee: Samsung Electronics Co., Ltd., Suwon, Rep. of Korea

[21] Appl. No.: 813,965

[22] Filed: Dec. 27, 1985

[30] Foreign Application Priority Data

Dec. 27, 1984 [KR] Rep. of Korea .................. 1984-8430

[51] Int. Cl.$^4$ ................................ C22F 1/04
[52] U.S. Cl. .................... 148/2; 148/12.7 A; 148/417
[58] Field of Search ............ 148/11.5 A, 12.7 A, 148/417, 2

[56] References Cited

U.S. PATENT DOCUMENTS 4,431,461 2/1984 Hoshino et al. ............... 148/11.5 A Primary Examiner—R. Dean
Attorney, Agent, or Firm—Oblon, Fisher, Spivak, McClelland & Maier

[57] ABSTRACT

An aluminium-base alloy for head drum of video cassette recorders(VCR), which contains copper, magnesium, nickel, silicon, iron and Titanium+Boron and to which chromium is added optionally.

The proposed alloy is characterized in that thermal expansion coefficient is less than $20.0 \times 10^{-6}/°C.$, hardness after heat treatment is more than 145(Hv) and dispersion of precipitates smaller than 7.5 micron in size is more than 95%.

13 Claims, 2 Drawing Sheets

| DIAMETER D | GAUGE LENGTH L | PARALLEL LENGTH P | RADIUS R |
|---|---|---|---|
| 14 | 50 | ≑ 60 | 15 |

… 1

ALUMINIUM BASE-ALLOY FOR HEAD DRUM OF VIDEO CASSETTE RECORDERS

FIELD OF THE INVENTION

The present invention relates to an aluminium alloy to be used for head drum of video cassette recorders, more praticularly to aluminium base alloy which comprises copper, magnesium, nickel, silicon, iron and Titanium+Boron.

BACKGROUND OF THE INVENTION

In the early stage when the video cassette recorders were developed, chromium-plated copper, austenitic stainless steel, ceramic-coated or alumite-treated cast aluminium had been used as a material for head drum and/or other parts of VCR on which the video tape travels.

However, as those materials were found to have many disadvantages in properties, manufacturing technology and cost, they are no longer used and mostly aluminium alloys are being used at present.

However, stabilized tape travelling is hard to be expected by using conventional aluminium alloy developed for die casting, because the aforesaid parts made from the alloy have many defects on their surfaces due to pinholes, rough and volumnious eutectic compounds and precipitates formed during the casting and heat treatment process.

Therefore, in order to solve such problems, many studies have been conducted and various aluminium alloys, e.g. Al-Si and Al-Cu alloys, have been developed.

Aluminium alloys of Al-Si group developed by adding the alloying elements such as Cu and/or Mg are usually for use in casting, but some of them are for forging.

Although these alloys are widely used for their excellent abrasion resistance and their free cutting characteristics without changing mechanical properties, they still have such defects that precision of finishing is inferior because the tools used in finishing work suffer high abrasion loss, deteriorating the surface smoothness, and magnetic tapes might be hurt by silicon particles with super hardness exfoliated from the alloys.

On the other hand, Al-Cu aluminium alloys with Mg and Ni added thereto and for use in forging also have several disadvantages such as poor abrasion resistance with insufficient hardness, inferior free cutting ability owing to easy curling of finishing chips and higher cracking rate in cold forging, while they can assure more stabilized travelling of video tape and better durability of machine tools.

Generally, materials for head drum of VCR should be non-magnetic ones, guarantee the video tape's travelling to be stabilized without damaging it and have high reliability regardless of long use or change of environments.

In order to satisfy the above conditions, materials for head drum of VCR is required to have following properties;

(1) Proper hardness value
(2) Excellent abrasion resistance
(3) Uniformity of internal structure
(4) Smaller thermal expansion coefficient
(5) Excellent workability guaranteeing proper surface roughness
(6) Excellent cold-forgeability or cold-castability
(7) Low manufacturing cost

OBJECTS OF THE INVENTION

The object of the present invention is to provide an improved aluminium alloy for head drum of VCR, more particularly an aluminium-copper-magnesium-nickel-silicon alloy.

Another object of this invention is accordingly to provide an aluminium alloy with low thermal expansion coefficient, high hardness and fine dispersion of the precipitates.

BRIEF DESCRIPTION OF THE DRAWINGS

The present invention will be described in detail in reference to the accompanying drawings in which.

DETAILED DESCRIPTION OF THE INVENTION

Figure 1:
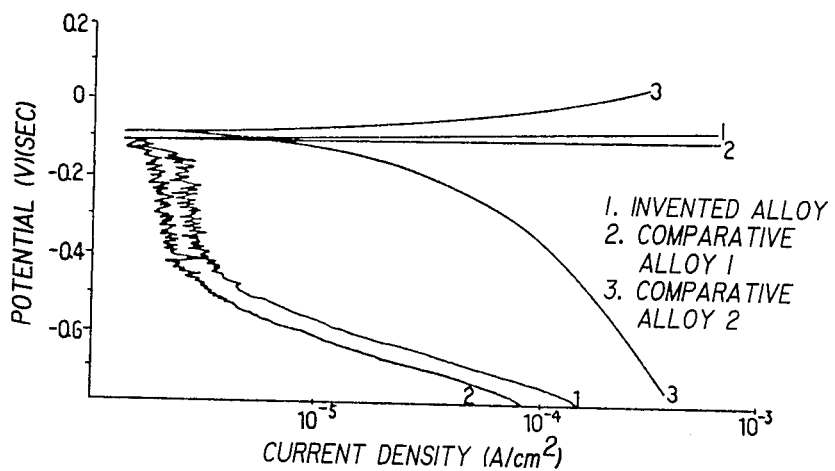
FIG. 1 shows the dynamic polarization curves for the alloy of the invention (hereinafter called as invented alloy) and comparative alloys.

The aluminium alloy of the present invention comprises 2.0–4.7% of Cu, 0.7–2.1% of Mg, 0.9–2.7% of Ni, 0.3–0.9% of Si, 0.1–0.6% of Fe, 0.01–0.04% of Ti+B and the remainder aluminium, in which 0.1–0.3% of Cr can be included optionally, and the aluminium alloy is characterized in that thermal expansion coefficient is less than $20.0 \times 10^{-6}/°C$., hardness after heat treatment (T6) is more than 145 (Hv) and distribution of precipitates smaller than 7.5 micron in size more than 95%.

For the present invention, industrial aluminium ingot with 99.5% of purity is applied, and the quantity and the reason of addition for each element are as follows;

Cu: This is the main element which controls the effect of heat treatment and improves mechanical strength and cutting characteristics. If this is present below 2.0%, strength is not sufficient, and if this is present over 4.7%, cold-forgeability decreases.

Mg: By increasing and accelerating the precipitation hardening of Al-Cu alloy, and by being precipitated as $Al_2CuMg$ or forming $Mg_2Si$ compound, this increases strength of alloy. Particularly, this improves the yield strength and increases the corrosion resistance. If this is less than 0.7%, this is not so effective, and if this is more than 2.1%, workability gets worse.

Ni: By forming intermetallic compound together with Al or Fe, this increases mechanical strength and improves abrasion resistance. When this is less than 0.9%, the effect is not sufficient, and when this is more than 2.7%, rough and voluminous intermetallic compound is yielded so that cracks may be formed in cold forging process and workability decreases.

Si: By being precipitated as a compound together with Mg, this provides an improvement in strength of the alloy, abrasion resistance and castability. When this is less than 0.3%, the effect is not sufficient, and when this is more than 0.9%, corrosion resistance and abrasion resistance will be affected.

Fe: By forming a compound together with Al and Ni, this increases abrasion resistance. When this is less than 0.1%, the effect is not sufficient, and when this is more than 0.6%, corrosion resistance will be degraded.

Ti+B: This prevents cracks in casting process and is effective in structure's micronization. When this is less than 0.01%, the effect is not sufficient, and when this is more than 0.04%, melting point will be in danger of rising.

Cr: By supressing the precipitation at grain boundaries in aging heat treatment, and by promoting the fine dispersion of precipitates throughout the matrix, this improves strength and corrosion resistance of the alloy. Range of 0.1–0.3% is desirable. This should be positively prevented from being added alike as Mn and Zn unless added intentionally.

Process for manufacturing the alloy in accordance with the present invention can be generally classified into melting, extruding, annealing, cold forging and T6 heat treatment.

In the process of the present invention, T6 heat treatment is executed after cold forging. In other words, solution heat treatment is conducted to the product made by cold forging through heating it up to the proper temperature for making the interior and exterior structures uniform.

And then, it is quenched to room temperature in the water and aging heat treatment is given by heating again up to the aging temperature during required time.

In the solution heat treatment, the treating temperature must be accurated. So to speak, because the temperature range, in which the solution heat treatment is possible, is very narrow and the change of phase diagram in accordance with addition of trace elements must be considered, strict temperature control is required.

When the product were heated to excessively high or low temperature in solution heat treatment, the insufficient solution heat treatment will greatly exercise a bad influence to effects of the subsequent quenching and aging heat treatment or working process.

When the product is quenched in the room temperature in the water, the different cooling velocities in the surface and inside of it due to the gradient of temperature can cause torsional stress or residual stress in the material which may lead to heat strain.

Though the product can be quenched in the water of 70°–100° C. in order to solve the above problems, this method brings about a concentrated precipitation at grain boundaries in the course of subsequent aging heat treatment and affects corrosion resistance of the product. In this case, adding a very small amount of cromium can help a fine dispersion of the precipitates.

The present invention will be described in detail for a preferred embodiment.

The more the form of precipitates is micronized and the closer the gaps between precipitates become, the more the mechanical properties are improved.

The chemical compositions of the alloy according to the present invention is shown on Table 1.

TABLE 1

| Chemical compositions of invented alloy | | | | | | | | | |
|---|---|---|---|---|---|---|---|---|---|
| Cu | Mg | Ni | Si | Fe | Ti + B | Restrictive elements | | | Al |
| 2.0 to 4.7 | 0.7 to 2.1 | 0.9 to 2.7 | 0.3 to 0.9 | 0.1 to 0.6 | 0.01 to 0.04 | 0.1 Max | 0.2 Max | 0.1 Max | Bal. |

(*Can be added up to 0.3% if necessary)

Table 2 lists chemical elements of an alloy as an embodiment of the present invention and those of comparative alloys.

TABLE 2

| | Comparison of chemical elements | | | | | | | | | |
|---|---|---|---|---|---|---|---|---|---|---|
| | Element | | | | | | | | | |
| Alloy | Cu | Mg | Ni | Si | Fe | Ti(+B) | Mn | Zn | Cr | Al |
| Invented alloy | 4.28 | 1.45 | 1.94 | 0.44 | 0.22 | 0.021 | 0.025 | 0.06 | 0.003 | Bal. |
| Comparative alloy 1 | 3.64 | 1.39 | 1.80 | 0.13 | 0.17 | 0.02 | 0.04 | 0.18 | 0.02 | Bal. |
| Comparative alloy 2 | 1.79 | 0.89 | 0.01 | 7.55 | 0.07 | 0.01 | 0.52 | 0.02 | 0.09 | Bal. |
| Comparative alloy 3 | 3.84 | 1.61 | 2.14 | 0.26 | 0.08 | 0.01 | 0.02 | 0.02 | 0.09 | Bal. |

Table 3 lists the process for manufacturing the alloy in accordance with the present invention.

TABLE 3

| | Manufacturing process according to the present invention | |
|---|---|---|
| No. | Name of process | Purpose and condition |
| 1. | Dissolution of base alloy | Manufacture of base alloys such as Al—Si, Al—Ni, Al—Cu |
| 2. | Casting of base alloy | 800° C.–850° C. |
| 3. | Charge to reverberatory furnace | Sufficient removal of moisture from material prior to being charged |
| 4. | Melting | 750° C. |
| 5. | Holding in holding furnace | Transfer by using runner |
| 6. | Primary degassing | Degasser is used. |
| 7. | Primary drossing | Coveral is used |
| 8. | Element charging | Adding elements such as Fe, Mg and Ti + B to molten base alloy |
| 9. | Secondary degassing | Degasser is used |
| 10. | Secondary drossing | Coveral is used. |
| 11. | Casting | 730° C., 100 mm/min. Filter is used. |
| 12. | Billet Cutting | Cutting into the size of 7" × 24" |
| 13. | Homogenizing | Holding at 507° C. for 20 hours. Cooling in furnace down to 400° C. |
| 14. | Billet preheating | 370° C. |
| 15. | Extruding | 350° C., 1 M/min, φ62.5 mm |
| 16. | Stretching | 1–1.5% |
| 17. | Cutting | 2.5 m |
| 18. | Annealing | Holding at 413° C. for 2.5 hours. Cooling in furnace down to 260° C. |
| 19. | Cutting | For use in cold forging |

TABLE 3-continued

Manufacturing process according to the present invention

| No. | Name of process | Purpose and condition |
|---|---|---|
| 20. | Pretreatment | Lubricating |
| 21. | Cold forging | Knuckle press, 50–110 Kg/mm² |
| 22. | Heat treatment | T6 heat treatment |
|  | Solution heat treatment | 505–510° C., 1–2 Hr |
|  | Quenching | To room temperature in the water |
|  | Aging heat treatment | 165–175° C., 8–10 Hr |
| 23. | Mechanical processing | Processing the roughness of the surface to be in contact with tape as 0.3 S. |

Characteristics of alloy according to the embodiment of the present invention will be hereinafter compared to comparative alloys used conventionally.

Table 4 lists mechanical properties of invented alloy and comparative alloys after T6 heat treatment.

Table 5 lists mechanical properties of the above alloys in non-heat-treated To state which determines cold forgeability.

Table 6 shows a comparison of thermal expansion coefficients from which the reliability can be determined.

Table 7 shows a comparison of corrosion properties.

Table 8 shows a dispersion of precipitates.

Table 9 shows the quantities of dispersed microscopic precipitates having the particle sizes smaller than 7.5 micron.

TABLE 4

Comparison of mechanical properties of alloys

| Alloy | Tensile strength (Kg/mm²) | 0.2% yield strength (Kg/mm²) | Elongation (%) | Hardness (%) |
|---|---|---|---|---|
| Invented alloy | 43$^8$ | 36$^3$ | 10$^8$ | 145 |
| Comparative alloy 1 | 44$^4$ | 33$^8$ | 6$^2$ | 143 |
| Comparative alloy 2 | 38$^3$ | 26$^7$ | 14$^3$ | 131 |
| Comparative alloy 3 | 42 | 32 | 14 | 139 |

TABLE 5

Comparison of mechanical properties in non-heat-treated state (To)

| Alloy | Tensile strength (Kg/mm²) | 0.2% yield strength (Kg/mm²) | Elongation (%) | Cold forgeability |
|---|---|---|---|---|
| Invented alloy | 17$^8$ | 8$^7$ | 20$^1$ | Very good |
| Comparative alloy 2 | 18 | 8$^5$ | 18 | Good |
| Comparative alloy 3 | 20 | 9 | 20 | Normal |

TABLE 6

Comparison of thermal expansion coefficients

| Alloy | Invented alloy | Comparative alloy 1 | Comparative alloy 2 |
|---|---|---|---|
| Thermal expansion coefficient (× 10$^{-6}$/°C.) | 20.0 | 22.0 | 23.5 |

TABLE 7

Comparison of corrosion characteristics

| Alloy | Immersion | Dynamic potential Corrosion | Pitting |
|---|---|---|---|
| Invented alloy | −185 to −195 | −135 | −120 |
| Comparative alloy 1 | −200 to −210 | −135 | −110 |
| Comparative alloy 2 | −130 to −170 | −90 | — |

TABLE 8

Comparison of precipitates

| SPL | area fraction (%) | 0–1.5* | 1.5–3.0 | 3.0–4.5 | 4.5–6.0 | 6.0–7.5 | 7.5–9.0 | 9.0–10.5 | 10.5–12.0 |
|---|---|---|---|---|---|---|---|---|---|
| Invented alloy | 9.480 | 42.4 | 32.1 | 11.7 | 6.1 | 3.1 | 1.8 | 0.95 | 0.4 |
| Comparative alloy 1 | 9.310 | 30.3 | 24.3 | 15.8 | 9.4 | 5.6 | 3.9 | 2.6 | 2.1 |
| Comparative alloy 2 | 17.799 | 32.2 | 26.2 | 15.8 | 9.1 | 5.7 | 3.6 | 2.5 | 1.5 |
| Comparative alloy 3 | 8.922 | 48.4 | 31.1 | 9.4 | 4.2 | 2.1 | 1.4 | 1.0 | 0.6 |
| Comparative alloy 4** | 10.975 | 32.3 | 38.2 | 15.8 | 6.9 | 3.3 | 1.6 | 0.8 | 0.5 |

| SPL | area fraction (%) | 12.0–13.5 | 13.5–15.0 | 15.0–16.5 | 16.5–18.0 | 18.0–19.5 | 19.5–21.0 | 21.0–22.5 | 22.5–24.0 |
|---|---|---|---|---|---|---|---|---|---|
| Invented alloy | 9.480 | 0.3 | 0.15 | 0.1 |  |  |  |  |  |
| Comparative alloy 1 | 9.310 | 1.3 | 1.1 | 0.8 | 0.6 | 0.4 | 0.3 | 0.2 | 0.3 |
| Comparative alloy 2 | 17.799 | 1.1 | 0.6 | 0.5 | 0.3 | 0.2 | 0.1 | 0.1 | 0.1 |
| Comparative alloy 3 | 8.922 | 0.4 | 0.3 | 0.2 | 0.2 | 0.1 | 0.1 | 0.1 | 0.1 |
| Comparative alloy 4** | 10.975 | 0.3 |  |  |  |  |  |  |  |

| SPL | area fraction (%) | 24.0–25.5 | 25.5–27.0 | 27.0–28.5 | 28.5–30.0 | 30.0–31.5 | 31.5–33.0 | 33.0–34.5 |
|---|---|---|---|---|---|---|---|---|
| Invented alloy | 9.480 |  |  |  |  |  |  |  |
| Comparative alloy 1 | 9.310 |  |  |  |  |  |  |  |

TABLE 8-continued

Comparison of precipitates

| | | | |
|---|---|---|---|
| Comparative alloy 2 | 17.799 | 0.1 | 0.1 |
| Comparative alloy 3 | 8.922 | | |
| Comparative alloy 4** | 10.975 | | |

*Unit: micron
**Al—Si alloy of Si 10% and Cu 2%

TABLE 9

Distribution of microscopic precipitates smaller than 7.5 micron in size

| Alloy | % |
|---|---|
| Invented alloy | 95.4 |
| Comparative alloy 1 | 85.4 |
| Comparative alloy 2 | 89.0 |
| Comparative alloy 3 | 95.2 |
| Comparative alloy 4 | 96.5 |

As can be seen from the above, the alloy according to the present invention can meet all of the required properties for VCR head drums.

As listed on Table 4, mechanical properties are excellent and especially hardness value over Hv 150 can be obtained, but reasonable hardness value can be maintained by changing heat treatment conditions in consideration of mechanical workability.

When chromium is added up to 0.3%, precipitates are dispersed fine throughout the matrix without any considerable change in the mechanical properties.

In comparison to other conventional alloys, it is proved that the alloy of the above embodiment according to this invention has excellent cold-forgeability resulting from low tensile strength and high elongation in To state.

The actual cold forging work has shown no cracking to occur. As can be seen on Table 6, average thermal expansion coefficient of the invented alloy is $20.0 \times 10^{-6}/°C$. which is lower than those of comparative alloys and therefore the alloy has an excellent reliability against the change of temperature.

With regard to corrosion characteristics of the alloy according to the present invention shown on Table 7, corrosion potential is lower than that of the comparative alloy 2, but when placed under serious corrosive surroundings as comparative alloy 1, very thin and dense film in passive state is immediately formed on the surface of the alloy and maintains it stable (See FIG. 1).

Figure 2:
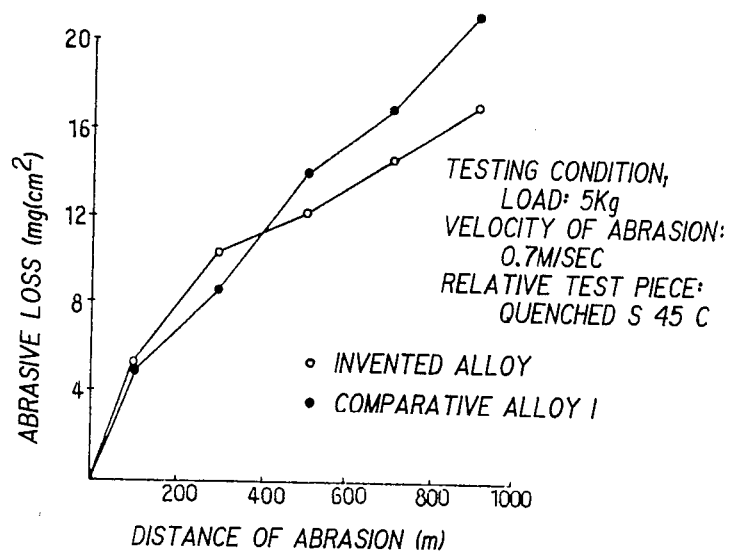
FIG. 2 shows the abrasion resistance of invented alloy and comparative alloy.

Regarding the abrasion resistance characteristics, it is almost similar to that of comparative alloy 1 as illustrated in FIG. 2.

Further, mechanical workability is proved to be excellent because most of trashes cut from the alloy come off easily without being rolled up and it is possible to process the surface roughness to less than 0.3S.

Table 10 shows the result of collective examining various properties of the alloy in the above embodiment according to the present invention.

TABLE 10

The result of collective examination of invented alloy's properties.

| Grade | Mechanical property | cold forgeability | Thermal expansion | Corrosion | Precipitation | Workability | Abrasion resistance |
|---|---|---|---|---|---|---|---|
| Excellent | O | O | O | | O | O | |
| Normal | | | | O | | | O |
| Bad | | | | | | | |

Among the various characteristics of the invented alloy, mechanical property, cold forgeability, thermal expansion property, precipitation property and mechanical workability are excellent, and corrosion characteristics and abrasion resistance are normal.

In conclusion, the aluminium alloy by the present invention is superior to the comparative conventional alloys for many aspects.

The methods used to test properties of invented alloy and comparative alloys are described hereinafter for reference.

Figure 3:
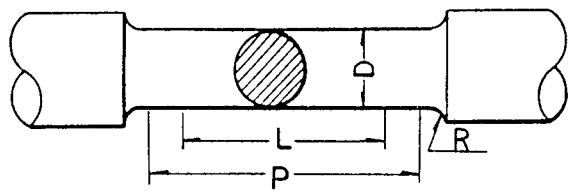
FIG. 3 shows a test piece for measuring mechanical properties of invented alloy and comparative alloy.

(1) Mechanical property
   Tensile strength, yield strength and elongation were measured by using UTM. The specification of the used test piece is shown in FIG. 3.

Figure 4:
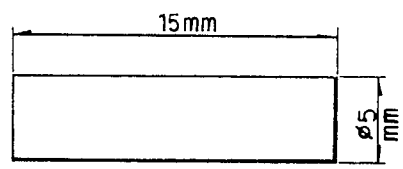
FIG. 4 shows a test piece for measuring thermal expansion property of invented alloy and comparative alloy.

(2) Thermal expansion
   For measuring thermal expansion characteristics, Thermal Dilatometer (ULVAC-DL 1500) was applied. FIG. 4 shows the test piece used in this measurement.

Figure 5:
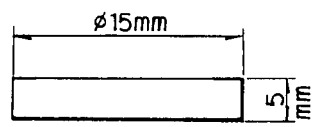
FIG. 5 shows a test piece for measuring corrosion resistance of invented alloy and comparative alloy.

(3) Corrosion characteristics
   For comparing corrosion characteristics, dynamic potential method was applied by using dynamic potential tester of P.A.R. Co. FIG. 5 shows the test piece used in this test.

(4) Precipitation property
   Image Analyser (LUZEX 600) is used.

Figure 6:
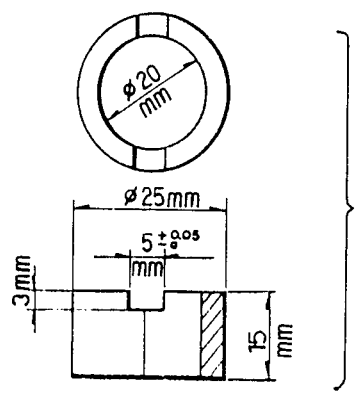
FIG. 6 shows a test piece for measuring abrasion resistance of invented alloy and comparative alloy.

(5) Abrasion resistance
   For measurement of abrasion resistance, a loss in weight against established abrasion distance was measured (reliability of scale was $10^{-5}$ g). Measuring instrument used was Model EFM-III-E made by Toyo BALDWIN. The specification of the test piece is shown in FIG. 6.

We claim:

1. A process for manufacturing a heat-treated aluminum-base alloy which consists essentially of by weight 2.0 to 4.7% of Cu, 0.7 to 2.1% of Mg, 0.9 to 2.7% of Ni, 0.3 to 0.9% of Si, 0.1 to 0.6% of Fe, 0.01 to 0.04% of Ti or B or a mixture thereof with the remainder being Al, and having a thermal expansion coefficient of less than $20.0 \times 10^{-6}/°C$., a hardness of more than 145 (Hv) and a uniform dispersion of precipitates such that greater than 95% of said precipitates are smaller than 7.5 microns in size, said process comprising:

(a) forming an alloy having the above-described alloying elements,
(b) extruding said alloy,
(c) annealing the extrudate,
(d) cold forging the annealed extrudate, and
(e) heat-treating the alloy, wherein said heat-treating consists of:
  (1) subjecting the alloy to a solution heat treatment at 505°–510° C. for 1 to 2 hours,
  (2) quenching the alloy in water at room temperature, and
  (3) subjecting the alloy to ageing heat treatment at 165°–175° C. for 8 to 10 hours.

2. A heat-treated aluminum-base alloy which consists essentially of by weight 2.0 to 4.7% of Cu, 0.7 to 2.1% of Mg, 0.9 to 2.7% of Ni, 0.3 to 0.9% of Si, 0.1 to 0.6% of Fe, 0.01 to 0.04% of Ti or B or a mixture thereof with the remainder being Al, and having a thermal expansion coefficient of less than $20.0 \times 10^{-6}/°C.$, a hardness of more than 145 (Hv) and a uniform dispersion of precipitates such that greater than 95% of said precipitates are smaller than 7.5 microns in size.

3. The alloy according to claim 2, which consists essentially of by weight 4.28% Cu, 1.45% Mg, 1.94% Ni, 0.44% Si, 0.22% Fe, 0.021% Ti and B, 0.025% Mn, 0.06% Zn, and 0.003% Cr with the balance being Al.

4. The alloy according to claim 2, including 0.1–0.3% Cr by weight.

5. The alloy according to claim 2 which contains by weight 4.28% Cu, 1.45% Mg, 1.94% Ni, 0.44% Si, 0.22% Fe, 0.021% Ti, 0.025% Mn, 0.06% Zn and, 0.003% Cr.

6. The process according to claim 1 wherein said alloy is formed by firstly preparing a base alloy of at least said Al, Si, Ni and Cu components, thereafter melting the base alloy and adding the other components, and casting the resulting alloy into a billet.

7. The process according to claim 1 including preheating the billet and thereafter performing said extruding step thereon.

8. The process according to claim 7, including stretching and cutting the extruded billet.

9. The process according to claim 1, wherein said cold forging is arranged to produce a rotary member for receiving a magnetic recording tape in contact therewith.

10. The process according to claim 9, including mechanically processing a surface of said member for receiving the tape, to have a surface roughness of 0.3S or less.

11. A head drum for a video cassette recorder made from the alloy according to claim 2.

12. A head drum for a video cassette recorder made from the alloy produced by the process of claim 1.

13. A head drum for a video cassette recorder made of an aluminum base alloy which consists essentially of by weight 2.0 to 4.7% of Cu, 0.7 to 2.1% of Mg, 0.9 to 2.7% of Ni, 0.3 to 0.9% of Si, 0.1 to 0.6% of Fe, 0.01 to 0.04% of Ti or B or a mixture thereof with the remainder being Al, and having a thermal expansion coefficient of less than $20.0 \times 10^{-6}/°C.$, a hardness of more than 145 (Hv) and a uniform dispersion of precipitates such that greater than 95% of said precipitates are smaller than 7.5 microns in size.

\* \* \* \* \*